US012571908B2

(12) United States Patent
Kuschk et al.

(10) Patent No.: US 12,571,908 B2
(45) Date of Patent: Mar. 10, 2026

(54) GENERATING POINT CLOUDS WITH APPENDED FEATURES FOR USE IN PERCEPTION

(71) Applicant: GM Cruise Holdings LLC, San Francisco, CA (US)

(72) Inventors: Georg Kuschk, Garmisch-Partenkirchen (DE); Marc Unzueta Canals, Munich (DE); Sven Möller, Lübbecke (DE); Michael Meyer, Munich (DE); Karl-Heinz Krachenfels, Garmisch-Partenkirchen (DE)

(73) Assignee: GM Cruise Holdings LLC, San Francisco, CA (US)

( * ) Notice: Subject to any disclaimer, the term of this patent is extended or adjusted under 35 U.S.C. 154(b) by 345 days.

(21) Appl. No.: 17/899,760

(22) Filed: Aug. 31, 2022

(65) Prior Publication Data

US 2024/0019569 A1 Jan. 18, 2024

(30) Foreign Application Priority Data

Jul. 13, 2022 (EP) ..................................... 22184794

(51) Int. Cl.
*G01S 13/931* (2020.01)
*B60W 60/00* (2020.01)
*G01S 13/89* (2006.01)

(52) U.S. Cl.
CPC ............ *G01S 13/931* (2013.01); *G01S 13/89* (2013.01); *B60W 60/00* (2020.02); *B60W 2420/408* (2024.01); *B60W 2556/45* (2020.02)

(58) Field of Classification Search
CPC ................................. G01S 13/931; G01S 7/35
See application file for complete search history.

(56) References Cited

U.S. PATENT DOCUMENTS

| | | | | |
|---|---|---|---|---|
| 11,536,801 B1 * | 12/2022 | Li | ........................... | G01S 13/58 |
| 2022/0196798 A1 * | 6/2022 | Chen | ...................... | G01S 7/354 |

FOREIGN PATENT DOCUMENTS

| | | | |
|---|---|---|---|
| JP | 2013019702 A | * | 1/2013 |
| WO | 2022139783 A2 | | 6/2022 |

OTHER PUBLICATIONS

"International Search Report and Written Opinion for PCT Patent Application No. PCT/US2023/071069", Mailed Date: Oct. 31, 2023, 203 pages.
"Extended European Search Report for European Patent Application No. 22184794.0", Mailed Date: Dec. 20, 2022, 8 pages.

* cited by examiner

*Primary Examiner* — Vladimir Magloire
*Assistant Examiner* — Eric K Hodac
(74) *Attorney, Agent, or Firm* — Honigman LLP; Matthew H. Szalach; Jonathan P. O'Brien

(57) ABSTRACT

The technologies described herein relate to a radar system that is configured to generate point clouds based upon radar tensors generated by the radar system. More specifically, the radar system is configured to identify bins in radar tensors that correspond to objects in an environment of the radar system, and to use energy values in other bins to construct a point cloud. A computing system detects objects in an environment of the radar system based upon the point clouds.

20 Claims, 7 Drawing Sheets

100

MECHANICAL SYSTEM — 102

COMPUTING SYSTEM — 104

PROCESSOR   108

MEMORY   110

PERCEPTION SYSTEM — 112

POINT CLOUD + FEATURE VALUES

RADAR SYSTEM — 106

PROCESSING CIRCUITRY — 114

POINT CLOUD GENERATOR — 116

RADAR SYSTEM

PROCESSING CIRCUITRY        114

PROCESSOR        202

MEMORY        204

RADAR TENSOR GENERATOR MODULE        206

POINT CLOUD GENERATOR SYSTEM        116

PEAK DETECTOR MODULE        208

THRESHOLD MODULE        210

BIN SELECTOR MODULE        212

NEURAL NETWORK        214

602 — START

600

604 — OBTAIN A PERCEPTION SYSTEM

606 — OBTAIN A POINT CLOUD GENERATOR SYSTEM

608 — JOINTLY TRAIN THE PERCEPTION SYSTEM AND THE POINT CLOUD GENERATION SYSTEM SUCH THAT WEIGHT MATRICES OF A FIRST NEURAL NETWORK OF THE PERCEPTION SYSTEM AND WEIGHT MATRICES OF A SECOND NEURAL NETWORK OF THE POINT CLOUD GENERATION SYSTEM ARE JOINTLY LEARNED

610 — END

GENERATING POINT CLOUDS WITH APPENDED FEATURES FOR USE IN PERCEPTION

RELATED APPLICATION

This application claims priority to European Patent Application No. 22184794.0, filed on Jul. 13, 2022, and entitled "GENERATING POINT CLOUDS WITH APPENDED FEATURES FOR USE IN PERCEPTION". The entirety of this application is incorporated herein by reference.

BACKGROUND

Radar sensor systems exhibit some advantages over other sensor systems such as lidar sensor systems and cameras with respect to their usage in certain scenarios. For instance, compared to cameras and lidar sensor systems, performance of radar sensor systems is more invariant to weather changes. In addition, radar sensor systems are able to capture velocity information nearly instantaneously. Further, radar sensor systems have a greater range than cameras and lidar sensor systems.

Active radar sensor systems, for predefined time intervals, emit radar signals into a surrounding environment. The radar signals reflect off objects in the environment and the radar system then detects the reflected radar signals. Conventionally, the radar sensor system is configured to construct radar tensors based upon the reflected radar signals, where a radar tensor has bins across several dimensions. Example dimensions include range, Doppler, and beam. The radar system then generates point clouds based upon the radar tensors and transmits the point clouds to a processing device that is in communication with the radar sensor system over a relatively low bandwidth connection, and the processing device processes the point clouds to identify objects in an environment of the radar system.

Conventionally, to generate a point cloud based upon a radar tensor, a processing system of the radar sensor performs several processing steps. First, the processing system performs peak analysis, such that bins in the radar tensor that have energies that are peaks are identified. Thereafter, thresholding is performed, such that bins that have energy values above a predefined threshold are selected. The processing system of the radar system treats such bins as corresponding to valid radar "hits" and constructs the point cloud based upon energy values in these bins. The radar sensor system transmits the point cloud to the processing device for further processing. The processing device receives the point cloud from the radar sensor system and identifies objects in the environment of the radar system based upon the point cloud.

Historically, energy values in bins other than those identified as corresponding to objects in the environment of the radar system are discarded and are not used in connection with generating the point cloud. In addition, the radar system does not transmit data tensors to the processing device, as data tensors are quite large, and it is impractical to transmit data tensors over communications channels found in most scenarios where radar systems are employed. Accordingly, the processing device coupled to the radar system is not provided with information from the data tensor that may be useful in connection with detecting, identifying, and tracking objects in the environment of the radar system.

SUMMARY

The following is a brief summary of subject matter that is described in greater detail herein. This summary is not intended to be limiting as to scope of the claims.

Described herein is a radar system that is configured to generate a point cloud. The radar system includes processing circuitry that is configured to perform several acts, where the acts include generating a radar tensor based upon radar returns detected by the radar system, where the radar tensor has bins that includes energy values. The acts also include identifying a first bin in the bins that corresponds to an object in an environment of the radar system, where the first bin has a first energy value, and further where the first bin is identified as corresponding to the object in the environment based upon the first energy value.

The acts also include computing a point cloud entry based upon the first energy value, as well as selecting a second bin in the bins based upon the first bin, where the second bin has a second energy value. In an example, several bins in a predefined neighborhood of the first bin are selected, where the several bins include the second bin. A value of a feature is then computed based upon the second energy value of the second bin. In an example, several values of several features are computed based upon energy values of the several bins in the predefined neighborhood of the first bin.

The acts also include appending the value of the feature to the point cloud entry to generate an updated point cloud entry. Moreover, the acts also include transmitting a point cloud that includes the updated point cloud entry to a computing system that is configured to detect and identify objects in the environment of the radar system based upon the point cloud.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
FIG. 1 is a schematic that illustrates an autonomous vehicle (AV) that includes a computing system and a radar system, where the output of a point cloud generator system executed by processing circuitry of the radar system is provided as input to a perception system executed by the computing system.

Various technologies pertaining to processing of radar sensor data are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein is a radar system that is configured to generate point clouds based upon radar tensors, where the point clouds are provided to a processing device that is in communication with a radar system, and further where the processing device processes the point clouds to, for example, identify and track objects in an environment of the radar system. The radar system performs the following operations to generate a point cloud based upon a radar tensor. First, the radar system generates the radar tensor based upon detected radar returns. The radar system then identifies peak energy values in bins of the radar tensor, where any suitable peak detection technology or technologies can be employed to identify the peak energy values in the bins of the radar tensor.

The radar system then optionally compares the identified peak energy values with a threshold. When a peak energy value is above the threshold, the radar system identifies that the peak energy value corresponds to an object in an environment of the radar system. Contrarily, when the peak energy value is below the threshold, the radar system identifies that the peak energy value does not correspond to an object in the environment of the radar system. Upon the peak energy values that correspond to objects in the environment of the radar system being identified, the radar system constructs a point cloud based upon the peak energy values and the bins that include such peak energy values. More specifically, the radar system computes a point in a point cloud for each peak energy value, where the point includes location values (e.g., x, y, and optionally z values), a velocity value that is indicative of relative velocity of the object, and a magnitude value.

Further, the radar system can compute values for features for inclusion in the point cloud, where the values for the features are based upon energy values of bins that are in a defined neighborhood of the bins identified as corresponding to object(s) in the environment. For example, the radar system can identify a first bin in the data tensor as corresponding to an object in an environment of the radar system. The radar system may then select several other bins in the radar tensor that are in a predefined neighborhood of the identified bin. For example, the predefined neighborhood may be within 1 bin of the identified bin, and accordingly the radar system can select the 27 bins that surround the identified bin in the radar tensor. The radar system can then compute feature values based upon the energy values in those 27 bins.

Pursuant to an example, the radar system can employ a neural network to compute the feature values. Input to the neural network can be the 27 energy values from the 27 bins that surround the identified bin. Output of the neural network can include some number of feature values, where the number of feature values can be selected by a designer of the neural network (and can be selected according to computing requirements). The radar system can then update the point cloud to include the computed feature values. Hence, when N feature values are computed, an entry in the point cloud can include location values, a velocity value, a magnitude value, and the N feature values. The radar system transmits the updated point cloud to a computing device that is in communication with the radar system, where the computing device can identify and track objects in an environment of the radar system based upon the updated point cloud.

Advantageously, the radar system described herein can be employed with perception systems that have been trained to consider the feature values described above as well as with perception systems that have not been updated to consider the feature values described above (e.g., a legacy perception system). The legacy perception system can receive point clouds from the radar system and discard the feature values. However, perception systems that have been trained to consider the feature values referenced above may have improved performance relative to legacy perception systems.

Examples set forth herein pertain to an autonomous vehicle (AV) receiving updated point clouds from a radar system and then autonomously performing a driving maneuver based upon the updated point clouds. It is to be understood, however, that point clouds generated by the radar system described herein can be employed in a variety of different scenarios, such as flight, in drone technologies, in monitoring technologies (e.g., security technologies), and so forth. AVs are set forth herein as one possible use case, and features of the claims are not to be limited to AVs unless such claims explicitly recite an AV.

Referring now to FIG. 1, an AV 100 is illustrated. The AV 100 can be a level 5 fully autonomous AV. While illustrated as an automobile, it is to be understood that the AV 100 may be a truck, a motorcycle, a ground-based drone, or other suitable AV. The AV 100 includes a mechanical system 102, a computing system 104, and a radar system 106. The mechanical system 102 is configured to facilitate performance of a driving maneuver, such as acceleration, deceleration, change of direction, etc.; accordingly, the mechanical system 102 can be or include a propulsion system (e.g., an electric motor, a gas engine, a transmission, a drive train, etc.), a braking system, a steering system, and so forth. The mechanical system 102 may also include a fuel system, an exhaust system, a cooling system, and/or a suspension system.

The computing system 104 includes a processor 108 and memory 110, where the memory 110 includes a perception system 112 that is configured to detect and/or identify an object in an environment surrounding the AV 100 based upon point clouds received from the radar system 106 of the AV 100. The computing system 104 is configured to output a command to the mechanical system 102 based upon the detected and/or identified object such that the AV 100 performs a driving maneuver, including, but not limited to, accelerating, decelerating, stopping, swerving, or some suitable combination thereof.

The radar system 106 includes processing circuitry 114 that is configured to generate and transmit point clouds to the computing system 104, where the point clouds are representative of surroundings of the radar system 106. The command output by the computing system 104 may be based at least in part on the point clouds transmitted from the radar system 106. While the radar system 106 is shown as being located at the front of the AV 100, with the computing system 104 being near a center of the AV 100, it is to be understood that the radar system 106 and the computing system 104 may be positioned at any suitable location within or upon the AV 100. While not illustrated, the AV 100 may also include a lidar sensor system, an ultra-sonic sensor system, an infrared sensor system, a global positioning system (GPS), an accelerometer, and/or other suitable sensor systems The radar system 106 is configured to generate a radar tensor based upon detected (reflected) radar signals, where the radar tensor includes bins across multiple dimensions, where the dimensions include, for example, range, Doppler, and beam. The radar system 106 is further configured to generate a point cloud based upon the radar tensor. In connection with generating the point cloud, the radar system 106 includes the processing circuitry 114 that executes a point cloud generator system 116, where the point cloud generator system 116 receives a radar tensor as input and generates a point cloud as output. As will be described in greater detail below, the point cloud generated by the point cloud generator system 116 includes conventional values, such as values for location (e.g., x, y, and optionally z values), velocity, and magnitude. In addition, the point cloud generated by the point cloud generator system 116 includes feature values not found in conventional point clouds. Briefly, in connection with generating the point cloud, the point cloud generator system 116 identifies a peak energy value in the radar tensor, where the point cloud generator system 116 can employ any suitable technique in connection with identifying the peak energy value. In a specific example, the point cloud generator system 116 can use a constant false alarm rate (CFAR) algorithm in connection with identifying the peak energy value. In addition to identifying the peak energy value, the point cloud generator system 116 also identifies a bin in the radar tensor that includes the peak energy value.

The point cloud generator system 116 computes an entry in the point cloud based upon the peak energy value, wherein such entry can include x, y, and z coordinates corresponding an object in the environment of the radar system 106, a velocity of such object, and a magnitude of the detected signal (which may be indicative of a type of the object). Further, the point cloud generator system 116 extracts energy values from bins that are within a predefined neighborhood of the identified bin that includes the peaks. For example, the point cloud generator system 116 extracts energy values from the 27 bins that surround the identified bin. It is to be understood, however, that any suitable approach for identifying the neighborhood of the identified bin can be employed. The point cloud generator system 116 computes feature values based upon the extracted energy values and updates the point cloud entry to include the computed feature values. The point cloud generator system 116 repeats this process for every peak energy value identified by the point cloud generator system 116 in the radar tensor. The point cloud generator system 116 can employ any suitable approach to compute the features values. In an example, the point cloud generator system 116 includes a neural network that receives the extracted energy values as input and generates the feature values as output. The radar system 106 transmits the point cloud (including the computed feature values) to the computing system 104, and the perception system 112 detects and identifies the object in the environment of the radar system 106 based upon the point cloud.

The perception system 112 can also include a neural network, where the neural network of the perception system 112 receives the point cloud as input and generates output based upon the point cloud. The perception system 112 assigns a label to the object represented in the raw radar data based upon the output, and the computing system 104 can control at least one component of the mechanical system 102, such as the propulsion system (e.g., an electric motor, a gas engine, etc.), the braking system, or the steering system to cause the AV 100 to perform a driving maneuver based upon the assigned label. In an example, the label can be a multi-dimensional state vector, wherein the vector can encode information such as position of the object in 3-dimensional space (e.g., x, y, and z coordinates), size of the object (e.g., height, width, and depth of the object), orientation of the object, and motion of the object (e.g., velocity, yaw, pitch, roll, etc.). In another example, the label can be a type of the object (e.g., vehicle, pedestrian, etc.).

The radar system 106 may be any suitable type of radar system, such as a continuous wave (CW) radar system (including a frequency modulated continuous wave (FMCW) radar system or an unmodulated CW radar system) or a pulsed radar system. The computing system 104 can be a central processing unit (CPU), a graphical processing unit (GPU), a field programmable gate array (FPGA), or any suitable combination of such computing devices. The neural network of the point cloud generator system 116 may be or include any suitable type of neural network, including a convolutional neural network, a deep neural network, a recurrent neural network, a graph neural network, etc. In one embodiment, the neural network of the point cloud generator system 116 is a submanifold sparse convolution network. The perception system 112 may also be or include any suitable type of neural network. In one embodiment, the neural network of the perception system 112 is a deep neural network (DNN), a recurrent neural network (RNN), or any other suitable type of network. Further, as will be described in greater detail below, the neural network of the point cloud generator system 116 and the neural network of the perception system 112 can be jointly trained based upon radar tensors and corresponding labels assigned thereto that identify presence and types of objects represented in the radar tensors. Such joint training results in learning of weight matrices of the weight matrices of the neural networks of the point cloud generator system 116 and perception system 112 jointly, such that the weight matrices of the two neural networks are co-optimized.

Figure 2:
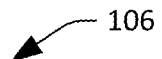
FIG. 2 is a functional block diagram of the radar system of FIG. 1 that includes a processor and a memory, where the memory has a point cloud generator system loaded therein.
Figure 2:
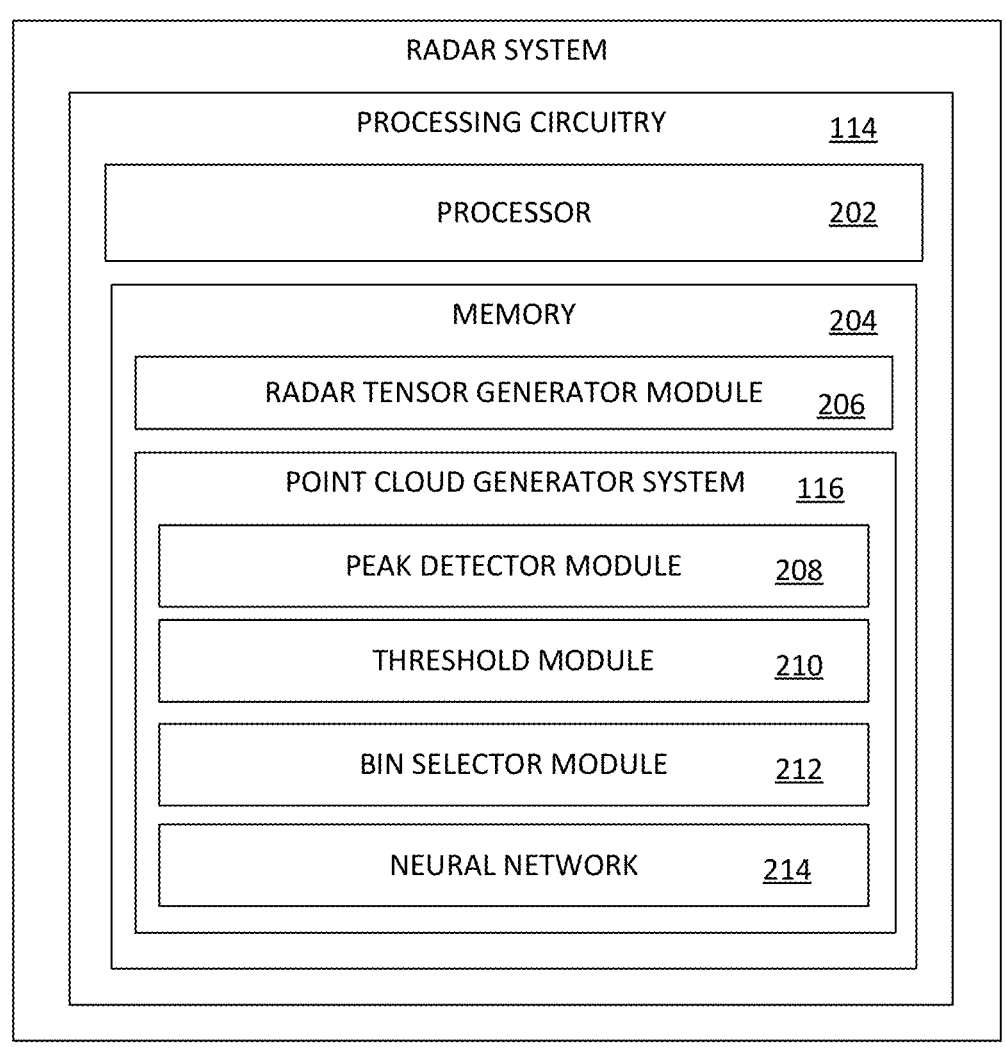

Referring now to FIG. 2, a functional block diagram of the radar system 106 is depicted. The radar system 106 may include several antennas, including one or more transmitting antennas and one or more receiving antennas. The transmitting antennas are configured to emit radar signals into an environment of the radar system 106 and the receiving antennas are configured to detect echo signals (reflections of the radar signals emitted by the transmitting antennas). In an alternative embodiment, the radar system 106 may be a passive radar system, such that the radar system 106 detects radar signals in the environment but does not emit the radar signals themselves. The radar system 106 also includes the processing circuitry 114, where the processing circuitry 114 is in communication with the antennas. The processing circuitry 114 includes a processor 202 and memory 204, where the memory 204 includes instructions that are executed by the processor 202. Specifically, the memory 204 includes a radar tensor generator module 206 that is configured to generate radar tensors based upon detected radar returns. As indicated above, a radar tensor is a multi-dimensional data structure that includes complex energy values in bins of the radar tensor.

The memory 204 further incudes the point cloud generator system 116, where the point cloud generator system 116 comprises a peak detector module 208, a threshold module 210, a bin selector module 212, and a neural network 214. The peak detector module 208 is configured to detect peak energy values in radar tensors. The threshold module 210 is configured to compare detected peak energy values with a predefined threshold. The bin selector module 212 is configured to select bins from a predefined neighborhood of a bin that includes a peak energy value that is greater than the threshold. Finally, the neural network 214 is configured to receive peak energy values from the predefined neighborhood referenced above and is further configured to output a set of feature values based upon the input peak energy values.

Operation of the radar system 106 when generating point clouds is now set forth. The radar tensor generator module 206 generates a radar tensor based upon radar signals detected by an antenna of the radar system 106. The radar tensor is multi-dimensional, and can include indices corresponding to range, Doppler, and beam. Thus, the radar tensor includes several bins, with each bin indexed by range, Doppler, and beam, and further where each bin includes an energy value for the bin.

The point cloud generator system 116 receives the radar tensor, whereupon the peak detector module 208 detects peaks in the radar tensor through utilization of any suitable peak detection technique, such as CFAR. For purposes of explanation, the following description will refer to detection of a single peak energy value in the radar tensor; it is to be understood, however, that the peak detector module 208 may detect several peak energy values in the radar tensor. Hence, the peak detector module 208 detects a peak energy value in the radar tensor, where the peak energy value is included in a first bin of the radar tensor.

The threshold module 210 receives the peak energy value and optionally compares the peak energy value with a predefined threshold. When the peak energy value is above the predefined threshold, the threshold module 210 can output an indication that the peak energy value in the first bin corresponds to a valid radar hit (e.g., corresponds to a radar return that reflected from an object in an environment of the radar system 106). Contrarily, when the peak energy value is not above the predefined threshold, the threshold module 210 can output an indication that the peak energy value in the first bin does not correspond to a valid radar hit.

Continuing with the example, the threshold module 210 can output an indication that the peak energy value is above the threshold. Based upon the peak energy value being above the threshold, the point cloud generator system 116 computes an entry for a point cloud, where the point cloud generator system 116 computes the entry based upon the peak energy value in the first bin. As noted previously, the entry for the point cloud can include the following values: [x, y, z, v, m], where x is a location coordinate in a first dimension, y is a location coordinate in a second dimension, z is a location coordinate in a third dimension, v is a velocity value, and m is a magnitude value.

The bin selector module 212 selects bins in the radar tensor that are within a predefined neighborhood of the first bin, where the bin selector module 212 selects such bins based upon the point cloud generator system 116 identifying the peak energy value in the first bin as corresponding to a valid radar hit. In an example, the bin selector module 212 selects bins that immediately surround the first bin in the radar tensor and extracts the energy values from such bins. Hence, the bin selector module 212 selects at least a second bin in the radar tensor (which is different from the first bin) and extracts an energy value therefrom.

The neural network 214 receives the energy values extracted from the radar tensor by the bin selector module 212 as input, and outputs feature values based upon such energy values. The neural network 214 then updates the entry of the point cloud referenced above to include the feature values. Thus, the entry can be [x, y, z, v, m, feature values]. Upon the point cloud generator system 116 generating the point cloud, the radar system 106 transmits the point cloud to the computing system 104, whereupon the perception system 112 detects and identifies objects represented in the point cloud. The computing system 104 controls the mechanical system 102 based upon the detected and identified objects.

It can be ascertained that the point cloud generator system 116 generates the point cloud based upon information not previously used to generate point clouds. Specifically, traditionally, energy values in bins that do not include peak energy values are not employed when point clouds are generated. It has been surprisingly found that utilizing these energy values to generate point clouds results in improved performance of the perception system 112.

Returning to the neural network 214, in an example, the neural network 214 may be trained based on a specific perception task; for instance, the neural network 214 can be trained with respect to detecting pedestrians, such that point clouds output by the point cloud generator system 116 are particularly well-suited for use in connection with detecting pedestrians. In another example, the neural network 214 can be trained with respect to detecting objects in particular weather conditions, such as when it is raining or foggy. Hence, point clouds output by the point cloud generator system 116 are particularly well-suited for detecting objects when it is raining or foggy.

Figure 3:
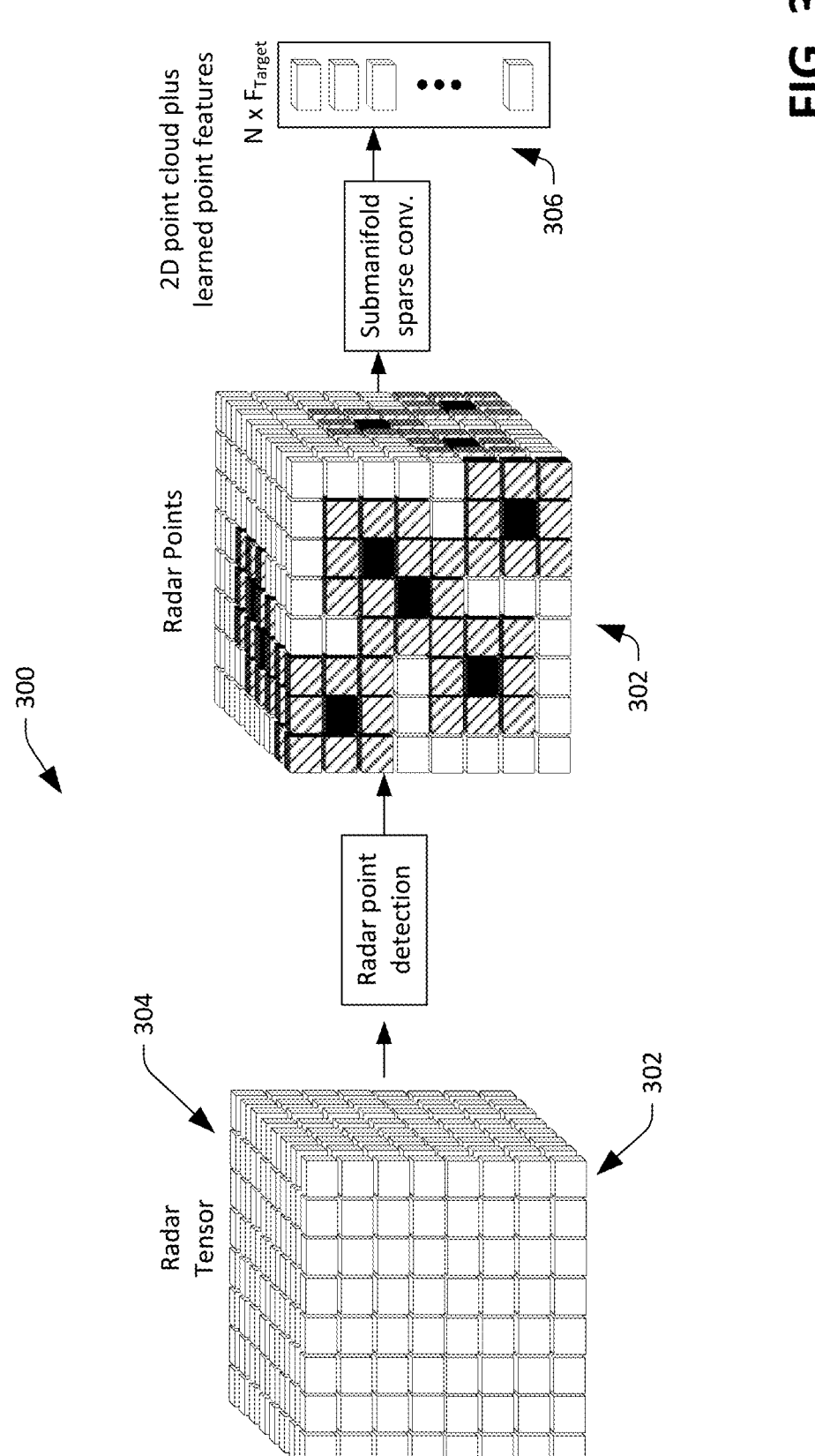
FIG. 3 depicts a radar tensor generated by a radar system, identification of bins in the radar tensor that correspond to objects in an environment of the radar system, and computation of features that are to be included in a point cloud that is generated based upon the identified bins.

Referring now to FIG. 3, a graphical representation 300 depicting construction of a point cloud based upon a radar tensor is illustrated. As shown, the radar tensor generator module 206 generates a radar tensor 302 based upon radar signals detected by antenna(s) of the radar system 106. The radar tensor 302 includes a plurality of bins 304, where the bins have energy values corresponding to multiple dimensions, such as range, Doppler, and beam. In the illustrated embodiment, the radar tensor 302 is three-dimensional. However, as discussed above, the radar tensor 302 may include more dimensions than three.

Radar point detection is performed on the radar tensor to identify bins in the radar tensor that represent valid radar hits. As described above, radar point detection can be performed through peak detection and thresholding. After the bins are identified, entries in point clouds are generated for the identified bins. Further, these entries are supplemented with feature values constructed based upon energy values in bins in predefined neighborhoods of the identified bin. As illustrated in FIG. 3, submanifold sparse convolution can be used in connection with computing point cloud entries and appending feature values to the point cloud entries. The output of the point cloud generator system 116 is a point cloud 306, as illustrated in FIG. 3.

Figure 4:
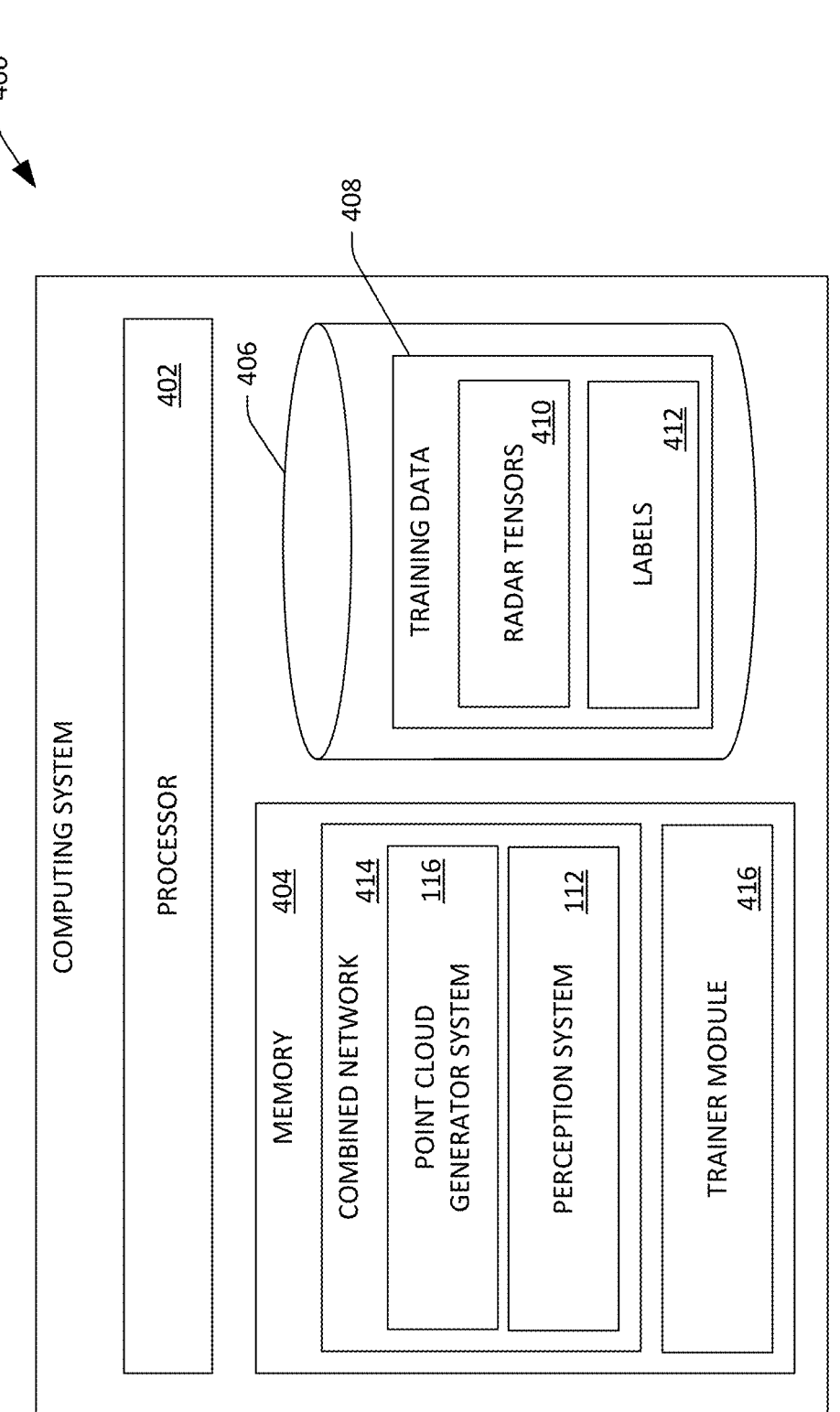
FIG. 4 is a functional block diagram of a computing system for jointly training a perception system of an autonomous vehicle (AV) and a point cloud generator system of a radar sensor.

Referring now to FIG. 4, a functional block diagram of a computing system 400 that is configured to jointly train the point cloud generator system 116 and the perception system 112 is illustrated. For example, the computing system 400 can be a server computing device or cluster of server computing devices. The computing system 400 includes a processor 402 and memory 404, where the processor 402 executes instructions that are stored in the memory 404. The computing system 400 further includes a data store 406 that comprises training data 408. The training data 408 includes radar tensors 410 generated by radar systems and labels 412 assigned to such radar tensors 410, where the labels, for example, can identify objects represented in the radar tensors (and optionally locations of such objects in a suitable coordinate system, such as cartesian space).

The memory 404 includes a combined neural network 414, where the combined neural network 414 comprises at least a portion of the point cloud generator system 116. The combined neural network 414 includes the modules of the point cloud generator system 116 and the perception system 112 in auto-differentiated form. As noted above, the perception system 112 includes a neural network, which, when trained, is configured to detect and identify objects based upon point clouds.

The memory 404 also includes a trainer module 416 that trains the combined neural network 414 based upon the training data 408. The trainer module 416 can utilize any suitable technologies in connection with training the combined neural network 414, including backpropagation and stochastic gradient descent (although other approaches are contemplated). During training of the combined neural network, weight matrices of the neural network 214 and weight matrices of the perception system 112 are jointly learned. After training, the trained point cloud generator system 116 is deployed on radar systems (including the radar system 106) while the perception system 112 is deployed on central computing systems, such as computing systems of AVs, airplanes, drones, security systems, etc. It is noted that, in theory, the combined neural network 414 can be executed on a single computing system; however, such approach is impractical, as radar tensors include a significant amount of data, requiring very high bandwidth interfaces to communicate the radar tensors from a radar system to a centralized computing system. Point clouds, however, are relatively small portions of data, and can be readily transmitted over a communications channel from the radar system to a centralized computing system.

Figure 5:
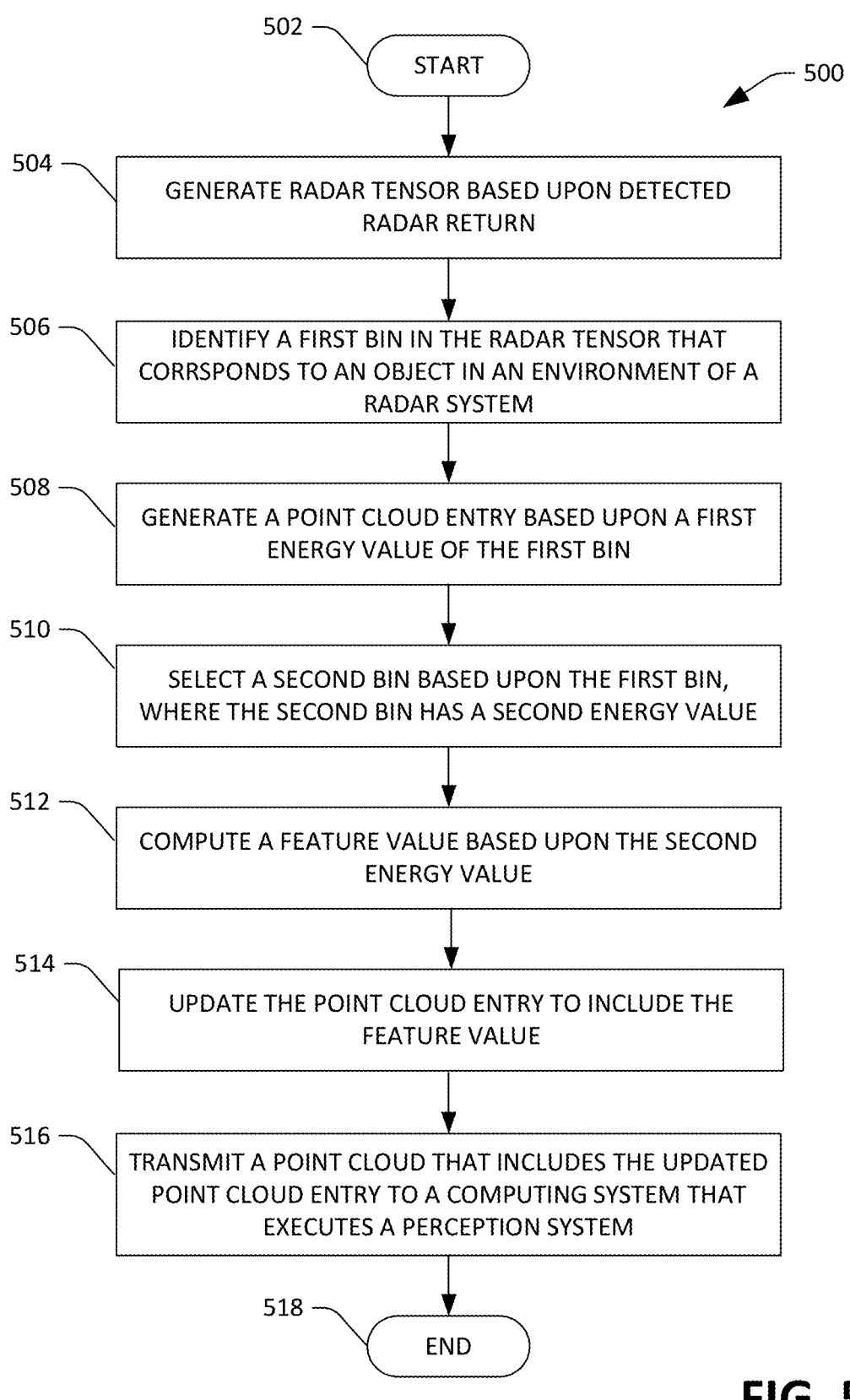
FIG. 5 is a flow diagram illustrating a method for generating a point cloud based upon detected radar signals, where the point cloud is configured for use by a computing system that is in communication with a radar system.
Figure 6:
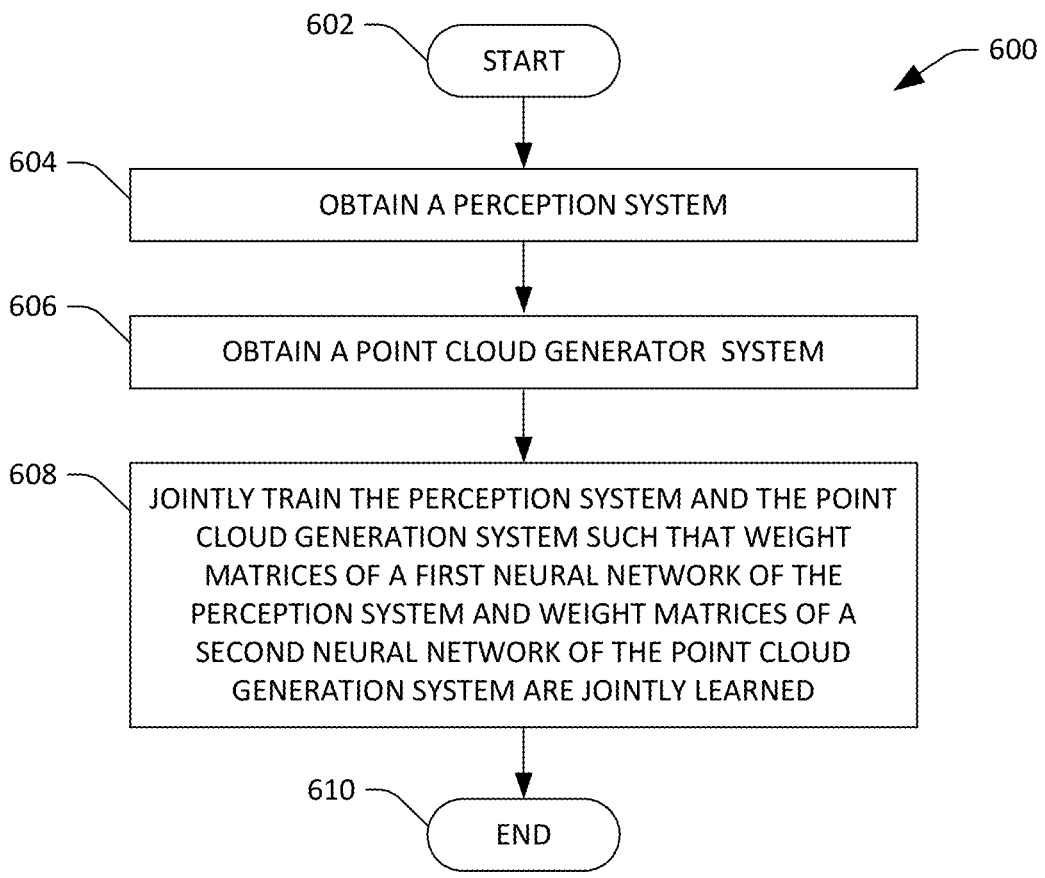
FIG. 6 is a flow diagram illustrating a method for jointly training a point cloud generator system and a perception system.

FIGS. 5 and 6 illustrate exemplary methodologies relating to radar systems. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

With reference to FIG. 5, a flow diagram illustrating a methodology 500 performed by a radar system is illustrated. The methodology 500 starts at 502, and at 504 a radar tensor is generated based upon detected radar returns. As described above, the radar tensor is n-dimensional and includes a number of bins that comprise energy values corresponding to the detected radar returns. The dimensions of the data cube may include range, beam, and Doppler dimensions.

At 506, a first bin is identified in the radar tensor, where the first bin includes a first energy value that corresponds to an object in an environment of the radar system. As noted previously, peak detection and thresholding can be used in connection with identifying the first bin.

At 508, a point cloud entry is generated based upon the first energy value; as noted above, the point cloud entry can include location values, a velocity value, and a magnitude value.

At 510, a second bin in the radar tensor is selected based upon the first bin, where the second bin has a second energy value therein. For instance, the second bin is selected based upon the second bin being in a predefined neighborhood of the first bin. In an example, the second bin is adjacent to the first bin in the radar tensor.

At 512, a feature value is computed based upon the second energy value. For example, the second energy value is provided as input to a neural network, and the neural network outputs the feature value based upon the second energy value.

At 514, the point cloud entry is updated to include the feature value computed at 512. At 516, a point cloud that includes the updated point cloud entry is transmitted from the radar system to a computing system that executes a perception system, where the perception system is configured to detect and identify objects in an environment of the radar system based upon the point cloud. The methodology 500 completes at 518.

With reference to FIG. 6, a flow diagram illustrating an exemplary methodology 600 for jointly training the point cloud generator system 116 and a perception system is illustrated. The methodology starts at 602, and at 604 the perception system is obtained. More precisely, a first neural network that, once trained, is to be included in the perception system is obtained.

At 606, the point cloud generator system 116 is obtained. More precisely, a second neural network that, once trained, is to be included in the point cloud generator system 116 is obtained.

At 608, the perception system and the point cloud generator system are jointly trained such that weight matrices of the first neural network and weight matrices of the second neural network are jointly optimized. The perception system and the point cloud generator system are trained based upon training data that comprises radar tensors and labels assigned thereto, as described above. Upon being trained, the point cloud generator system is instantiated on a radar system. Further, the perception system is instantiated on a computing system that is separate from the radar system. Hence, the radar system generates point clouds based upon detected radar signals and the computing system detects and identifies objects in the environment of the radar system based upon the point clouds received from the radar system. The methodology 600 completes at 610.

Figure 7:
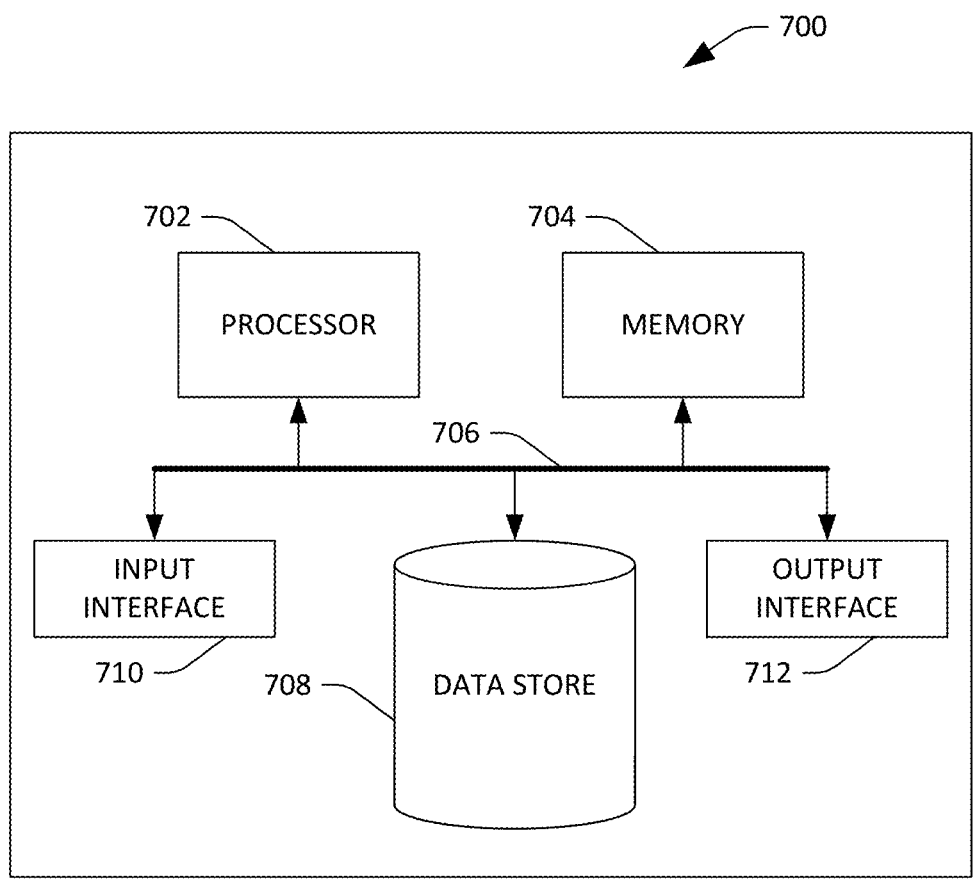
FIG. 7 is an example computing system.

Referring now to FIG. 7, a high-level illustration of a computing device 700 that can be used in accordance with the systems and methodologies disclosed herein is illustrated. For instance, the computing device 700 may be used in a system that is configured to generate point clouds for use in connection with detecting and identifying objects in an environment of radar system. In another example, the computing device 700 may be used in a system that is configured to detect and identify objects based upon received point clouds. In yet another example, the computing device 700 may be used in a system that is configured to train neural networks. The computing device 700 includes at least one processor 702 that executes instructions that are stored in a memory 704. The processor 702 may be a central processing unit (CPU), a graphical processing unit (GPU), a field programmable gate array (FPGA), or any suitable combination of such computing devices. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store sensor data, data cubes, point clouds, heatmaps, etc.

The computing device 700 additionally includes a data store 708 that is accessible by the processor 702 by way of the system bus 706. The data store 708 may include executable instructions, sensor data, data cubes, point clouds, etc.

The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Systems and methods have been described herein in accordance with at least the examples set forth below.

(A1) In one aspect, a method performed by processing circuitry of a radar system is disclosed herein, where the method includes generating a radar tensor based upon radar returns detected by the radar system, where the radar tensor has bins that include energy values. The method also includes identifying a first bin in the bins that corresponds to an object in an environment of the radar system, where the first bin has a first energy value, and further where the first bin is identified as corresponding to the object in the environment based upon the first energy value. The method additionally includes computing a point cloud entry based upon the first energy value and selecting a second bin in the bins based upon the first bin, where the second bin has a second energy value. The method further includes computing a value of a feature based upon the second energy value of the second bin and adding the value of the feature to the point cloud entry to generate an updated point cloud entry. The method also includes transmitting a point cloud that comprises the updated point cloud entry to a computing system that is configured to detect and identify objects in the environment of the radar system based upon the point cloud.

(A2) In some embodiments of the method of (A1), computing the value of the feature comprises providing the second energy value to a neural network, where the neural network outputs the value of the feature.

(A3) In some embodiments of the method of (A2), the neural network outputs values for several features based upon the second energy value, where the values for the several features are appended to the point cloud entry to generate the updated point cloud entry.

(A4) In some embodiments of at least one of the methods of (A2)-(A3), the neural network is a submanifold convolutional network.

(A5) In some embodiments of at least one of the methods of (A1)-(A4), the second bin is selected based upon a location of the second bin relative to the first bin in the radar tensor.

(A6) In some embodiments of at least one of the methods of (A1)-(A5), the method also includes defining a neighborhood of the first bin subsequent to the first bin being identified, where the neighborhood of the first bin includes bins, where the bins comprise the second bin, and further where the bins have energy values. The method also includes selecting the bins based upon the bins being included in the neighborhood of the first bin, where the value of the feature is computed based upon the energy values of the bins.

(A7) In some embodiments of the method of (A6), a plurality of feature values are computed based upon the energy values of the bins.

(A8) In some embodiments of at least one of the methods of (A1)-(A7), the radar system is included in an AV.

(A9) In some embodiments of at least one of the methods of (A1)-(A7), the computing system executes a perception system, where an AV performs a driving maneuver based upon output of the perception system.

(A10) In some embodiments of at least one of the methods of (A1)-(A9), the point cloud entry comprises values for location, a value for velocity, and a value for magnitude.

(B1) In another aspect, a radar system that includes processing circuitry is disclosed herein, where the processing circuitry if configured to perform at least one of the methods disclosed herein (e.g., at least one of (A1)-(A10)).

(C1) In yet another aspect, an AV includes a radar system, a mechanical system, and a computing system that is in communication with the radar system and the mechanical system. The radar system is configured is configured to perform at least one of the methods disclosed herein (e.g., at least one of (A1)-(A10)). Additionally, the computing system is configured to perform acts, where the acts include: 1) detecting and identifying an object in an environment of the AV based upon the point cloud; and 2) controlling the mechanical system based upon the detected and identified object.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A radar system comprising:
processing circuitry that is configured to perform acts comprising:
generating a radar tensor based upon radar returns detected by the radar system, wherein the radar tensor has bins that comprise energy values;
identifying a first bin in the bins that corresponds to an object in an environment of the radar system, wherein the first bin has a first energy value that satisfies a predefined threshold, and further wherein the first bin is identified as corresponding to the object in the environment based upon the first energy value;
computing a point cloud entry based upon the first energy value;
selecting a second bin in the bins based upon the first bin, wherein the second bin is adjacent to the first bin and has a second energy value that fails to satisfy the predefined threshold;
computing a value of a feature based upon the second energy value of the second bin, wherein computing the value of the feature comprises providing the second energy value and neighbor energy values from additional bins in a predefined neighborhood of the first bin to a submanifold sparse convolutional neural network, and wherein the submanifold sparse convolutional neural network outputs the value of the feature based on the second energy value and the neighbor energy values;
appending the value of the feature to the point cloud entry to generate an updated point cloud entry; and
transmitting a point cloud that comprises the updated point cloud entry to a computing system that is configured to detect and identify objects in the environment of the radar system based upon the point cloud,
wherein the computing system comprises a perception neural network, and wherein weight matrices of the submanifold sparse convolutional neural network are co-optimized with weight matrices of the perception neural network using joint training.

2. The radar system of claim 1, wherein the second bin comprises a predetermined number of bins that surround the first bin.

3. The radar system of claim 2, wherein the submanifold sparse convolutional neural network outputs values for several features based upon the second energy value, and further wherein the values for the several features are appended to the point cloud entry to generate the updated point cloud entry.

4. The radar system of claim 1, wherein the second bin is selected based upon a location of the second bin relative to the first bin in the radar tensor.

5. The radar system of claim 1, the acts further comprising:
subsequent to the first bin being identified, defining the predefined neighborhood of the first bin, wherein the predefined neighborhood of the first bin comprises a plurality of bins, wherein the plurality of bins comprises the second bin, and further wherein the plurality of bins have a plurality of energy values, wherein the plurality of bins immediately surround the first bin; and
selecting the plurality of bins based upon the plurality of bins being included in the predefined neighborhood of the first bin, wherein the value of the feature is computed based upon the plurality of energy values of the plurality of bins.

6. The radar system of claim 5, wherein a plurality of feature values are computed based upon the plurality of energy values of the plurality of bins.

7. The radar system of claim 1 being included in an autonomous vehicle (AV).

8. The radar system of claim 1, wherein an autonomous vehicle (AV) performs a driving maneuver based upon output of the perception neural network.

9. The radar system of claim 1, wherein the point cloud entry comprises values for location, a value for velocity, and a value for magnitude of a signal corresponding to the first energy value.

10. The radar system of claim 1, wherein selecting the second bin comprises selecting a plurality of bins from a predefined neighborhood of the first bin.

11. A method performed by a radar system, the method comprising:
generating a radar tensor based upon radar returns detected by the radar system, wherein the radar tensor has bins that comprise energy values;
identifying a first bin in the bins that corresponds to an object in an environment of the radar system, wherein the first bin has a first energy value that satisfies a predefined threshold, and further wherein the first bin is identified as corresponding to the object in the environment based upon the first energy value; computing a point cloud entry based upon the first energy value;

selecting a second bin in the bins based upon the first bin, wherein the second bin is adjacent to the first bin and has a second energy value that fails to satisfy the predefined threshold;

computing a value of a feature based upon the second energy value of the second bin, wherein computing the value of the feature comprises providing the second energy value and neighbor energy values from additional bins in a predefined neighborhood of the first bin to a submanifold sparse convolutional neural network, and wherein the submanifold sparse convolutional neural network outputs the value of the feature based on the second energy value and the neighbor energy values;

appending the value of the feature to the point cloud entry to generate an updated point cloud entry; and transmitting a point cloud that comprises the updated point cloud entry to a computing system that is configured to detect and identify objects in the environment of the radar system based upon the point cloud, wherein the computing system comprises a perception neural network, and wherein weight matrices of the submanifold sparse convolutional neural network are co-optimized with weight matrices of the perception neural network using joint training.

12. The method of claim 11, wherein the second bin comprises a predetermined number of bins that surround the first bin.

13. The method of claim 12, wherein the submanifold sparse convolutional neural network outputs values for several features based upon the second energy value, and further wherein the values for the several features are appended to the point cloud entry to generate the updated point cloud entry.

14. The method of claim 11, wherein the second bin is selected based upon a location of the second bin relative to the first bin in the radar tensor.

15. The method of claim 11, further comprising:

subsequent to the first bin being identified, defining the predefined neighborhood of the first bin, wherein the predefined neighborhood of the first bin comprises a plurality of bins, wherein the plurality of bins comprises the second bin, and further wherein the plurality of bins have a plurality of energy values, wherein the plurality of bins immediately surround the first bin; and selecting the plurality of bins based upon the plurality of bins being included in the predefined neighborhood of the first bin, wherein the value of the feature is computed based upon the plurality of energy values of the plurality of bins.

16. The method of claim 15, wherein a plurality of feature values are computed based upon the plurality of energy values of the plurality of bins.

17. The method of claim 11 being included in an autonomous vehicle (AV).

18. The method of claim 11, wherein an autonomous vehicle (AV) performs a driving maneuver based upon output of the perception neural network.

19. The method claim 11, wherein selecting the second bin comprises selecting a plurality of bins from a predefined neighborhood of the first bin.

20. An autonomous vehicle comprising:

a radar system;

a mechanical system; and a computing system that is in communication with the radar system and the mechanical system, wherein the radar system is configured to perform acts comprising:

generating a radar tensor based upon radar returns detected by the radar system, wherein the radar tensor has bins that comprise energy values;

identifying a first bin in the bins that corresponds to an object in an environment of the radar system, wherein the first bin has a first energy value that satisfies a predefined threshold, and further wherein the first bin is identified as corresponding to the object in the environment based upon the first energy value;

computing a point cloud entry based upon the first energy value;

selecting a second bin in the bins based upon the first bin, wherein the second bin is adjacent to the first bin and has a second energy value that fails to satisfy the predefined threshold;

computing a value of a feature based upon the second energy value of the second bin, wherein computing the value of the feature comprises providing the second energy value and neighbor energy values from additional bins in a predefined neighborhood of the first bin to a submanifold sparse convolutional neural network, and wherein the submanifold sparse convolutional neural network outputs the value of the feature based on the second energy value and the neighbor energy values;

appending the value of the feature to the point cloud entry to generate an updated point cloud entry; and transmitting a point cloud that comprises the updated point cloud entry to the computing system;

wherein the computing system is configured to perform acts comprising:

detecting and identifying an object in an environment of the AV based upon the point cloud; and controlling the mechanical system based upon the detected and identified object, wherein the computing system comprises a perception neural network, and wherein weight matrices of the submanifold sparse convolutional neural network are co-optimized with weight matrices of the perception neural network using joint training.

* * * * *